United States Patent
Goel et al.

(10) Patent No.: US 8,517,265 B2
(45) Date of Patent: Aug. 27, 2013

(54) ERROR FREE METHOD FOR WIRELESS DISPLAY TAG (WDT)

(75) Inventors: Anurag Goel, Pleasanton, CA (US); Mark Douglas McDonald, Campbell, CA (US); Sunit Saxena, Monte Sereno, CA (US); Leonard Mark Dorfman, Santa Clara, CA (US)

(73) Assignee: Altierre Corporation, San Jose, CA (US)

( * ) Notice: Subject to any disclaimer, the term of this patent is extended or adjusted under 35 U.S.C. 154(b) by 0 days.

(21) Appl. No.: 11/019,660

(22) Filed: Dec. 20, 2004

(65) Prior Publication Data

US 2005/0156030 A1    Jul. 21, 2005

Related U.S. Application Data

(60) Provisional application No. 60/530,819, filed on Dec. 18, 2003, provisional application No. 60/530,818, filed on Dec. 18, 2003, provisional application No. 60/530,817, filed on Dec. 18, 2003, provisional application No. 60/530,816, filed on Dec. 18, 2003, provisional application No. 60/530,795, filed on Dec. 18, 2003, provisional application No. 60/530,790, filed on Dec. 18, 2003, provisional application No. 60/530,783, filed on Dec. 18, 2003, provisional application No. 60/530,784, filed on Dec. 18, 2003, provisional application No. 60/530,782, filed on Dec. 18, 2003, provisional application No. 60/530,823, filed on Dec. 18, 2003.

(51) Int. Cl.
*G06K 15/00* (2006.01)

(52) U.S. Cl.
USPC .......................................... 235/383; 235/385

(58) Field of Classification Search
USPC ..................... 235/383, 375, 385, 462.01, 373
See application file for complete search history.

(56) References Cited

U.S. PATENT DOCUMENTS

| | | | |
|---|---|---|---|
| 3,609,741 A | 9/1971 | Miller | |
| 4,303,910 A | 12/1981 | McCann | |
| 4,740,779 A | 4/1988 | Clearly et al. | |
| 4,888,709 A | 12/1989 | Revesz et al. | |
| 4,896,319 A | 1/1990 | Lidinsky et al. | |
| 5,151,684 A * | 9/1992 | Johnsen | 340/568.1 |
| 5,548,282 A * | 8/1996 | Escritt et al. | 340/5.91 |
| 5,619,416 A * | 4/1997 | Kosarew | 700/225 |
| 5,686,902 A | 11/1997 | Reis et al. | |
| 5,726,431 A * | 3/1998 | VanDonkelaar et al. | 235/383 |
| 5,821,523 A * | 10/1998 | Bunte et al. | 235/472.01 |
| 5,892,441 A * | 4/1999 | Woolley et al. | 340/539.26 |
| 6,058,292 A | 5/2000 | Terreault | |
| 6,217,966 B1 * | 4/2001 | Finster et al. | 428/42.1 |
| 6,253,190 B1 | 6/2001 | Sutherland | |
| 6,269,342 B1 | 7/2001 | Brick et al. | |
| 6,715,675 B1 | 4/2004 | Rosenfeld | |
| 2002/0042741 A1 | 4/2002 | Wilson, III et al. | |
| 2002/0122467 A1 | 9/2002 | Camp, Jr. et al. | |
| 2003/0104848 A1 | 6/2003 | Brideglall | |
| 2005/0025218 A1 | 2/2005 | Briles | |

* cited by examiner

*Primary Examiner* — Daniel St.Cyr
(74) *Attorney, Agent, or Firm* — DLA Piper LLP (US)

(57) ABSTRACT

A method for error free initialization of a display tag includes providing a display tag, scanning the display tag with a near field source to cause the display tag to generate identification indicia, storing the identification indicia if only a single display tag generates that identification indicia, scanning the barcode of a product to be associated with the display tag, and associating, in a database, the identification indicia of the display tag with the barcode of the product to be associated with that display tag.

8 Claims, 4 Drawing Sheets

ERROR FREE METHOD FOR WIRELESS DISPLAY TAG (WDT)

RELATED APPLICATIONS

The present invention claims the benefit of priority from the following U.S. provisional applications: U.S. patent Ser. No. 60/530,819 filed Dec. 18, 2003 entitled "Wireless Display Tag (WDT) Using Amplified Backscatter"; U.S. patent Ser. No. 60/530,818 filed Dec. 18, 2003 entitled "Wireless Display Tag (WDT) Using an Active Transmitter"; U.S. patent Ser. No. 60/530,817 filed Dec. 18, 2003 entitled "Wireless Display Tag (WDT) Using an Active Receiver"; U.S. patent Ser. No. 60/530,816 filed Dec. 18, 2003 entitled "Wireless Display Tag (WDT) Using an Active Transmitter and Diode Receiver"; U.S. patent Ser. No. 60/530,795 filed Dec. 18, 2003 entitled "Wireless Display Tag (WDT) Using Active and Backscatter Transceivers"; U.S. patent Ser. No. 60/530,790 filed Dec. 18, 2003 entitled "Wireless Display Tag (WDT) Unit"; U.S. patent Ser. No. 60/530,783 filed Dec. 18, 2003 entitled "RF Backscatter Transmission with Zero DC-Power Consumption"; U.S. patent Ser. No. 60/530,784 filed Dec. 18, 2003 entitled "Wireless Display Tag (WDT) with Environmental Sensors"; U.S. patent Ser. No. 60/530,782 filed Dec. 18, 2003 entitled "High Readability Display for a Wireless Display Tag (WDT)"; U.S. patent Ser. No. 60/530,823 filed Dec. 18, 2003 entitled "Wireless Display Tag (WDT) Initialization;

This application is also related to the following US utility applications filed simultaneously herewith; assigned to the same assignee as the present invention, and incorporated herein by reference in full: U.S. patent application Ser. No. 11/019,978, entitled "Wireless Display Tag Unit"; U.S. patent application Ser. No. 11/019,976, entitled "Wireless Display Tag (WDT) Using Active and Backscatter Transceivers"; U.S. patent application Ser. No. 11/019,494, entitled "RF Backscatter Transmission with Zero DC Power Consumption"; U.S. patent application Ser. No. 11/019,705, entitled "Low Power Wireless Display Tag Systems and Methods"; and U.S. patent application Ser. No. 11/019,916, entitled "Multiuser Wireless Display Tag Infrastructure and Methods."

BACKGROUND OF THE INVENTION

Referring now to FIGS. 1, 2, and 3, current systems and methods for displaying information, such as pricing, consist of using a paper label 12 on a pricing display 10 at the retail store shelf edge. Advancement in systems and methods of displaying information, which consists of pricing details, consist of using electronic displays 20. Electronic displays can display item pricing and other information related to the product or item. The displays 20 can be updated via-Radio Frequency (RF) or Infra Red (IR) signals from a transmitter/receiver device 22.

Information can be downloaded to the devices 22 from the store's central computer/server unit 24 that can be coupled via a Wide Area Network (referred to heretofore as the "internet") to a central server 26. Accordingly, updates to the information can be delivered to the unit 24 via the internet and then to the displays 20 through the device 22.

In order for the correct product specific pricing and other product information to be downloaded to each of the displays 20 that are intended to label each of the specific products, each of the displays 20 must initially be associated with the product and that corresponding correlation is stored in the unit 24.

Each display 20 is sent out from the factory with a unique identification. This identification is stored in an internal memory of the display 20.

Current methods of association consist of associating the displays 20 with a product's Store Keeping Unit (SKU). This association is created manually by associating a UPC code number denoting a display's 20 intrinsic ID with a product SKU by manually keying in the information pair into a database. Once each of the SKU numbers have been associated with a display's 20 unique ID denoted by a UPC code, an application program residing at the unit 24 prints out decals to be affixed to each of the displays 20. These decals have human readable information printed on them, such as the product name and the barcode or the UPC code ID of each display 20. Each decal is then matched to the corresponding display 20 and affixed to the face of the display 20.

Store personnel identify, through visual inspection, the proper display selected from the numerous displays that corresponds to the proper product on the shelf. Additionally, the store personnel must identify which unit belongs to which aisle, which shelf edge and which product and install each one of them next to the appropriate product that is located on the shelf. Each display 20 is then manually mounted near the product it is supposed to represent via a process of manually matching the product name on the display's 20 decal with that of the product on the shelf.

Current methods and systems for initialization of the display 20 and the related process, as described, is a multi-step, labor intensive process and prone to human error at every step. For example, manually matching a pre-initialized unit 20 to the proper decal and the proper assigned shelf space is highly error prone.

Consequently, what is needed is a system and method for matching numerous electronic displays to the proper shelf space while significantly reducing or even eliminating the possibility of human introduced error.

SUMMARY OF INVENTION

A system and method are disclosed for matching numerous electronic displays to the proper product located on a specific shelf space while significantly reducing or even eliminating the possibility of human introduced error.

In one embodiment an error-free process for initialization of a Wireless Display Tag (WDT) or an Electronic Shelf Label (ESL) that eliminates manual data entry is disclosed; the need for personnel to track a sequence of actions associated with initializing and installing the ESL are also eliminated through the use of a handheld wireless remote unit.

DESCRIPTION OF THE INVENTION

Figure 1:
FIG. 1 represents prior art system utilizing a paper label for a product display.
Figure 2:
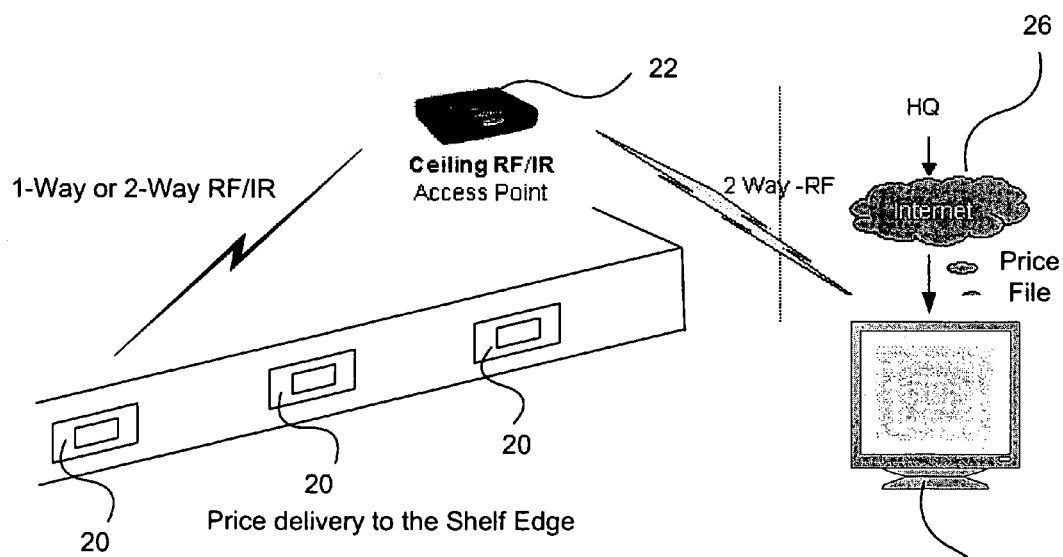
FIG. 2 represents prior art system utilizing a digital display as a product display containing product information related to the product.
Figure 3:
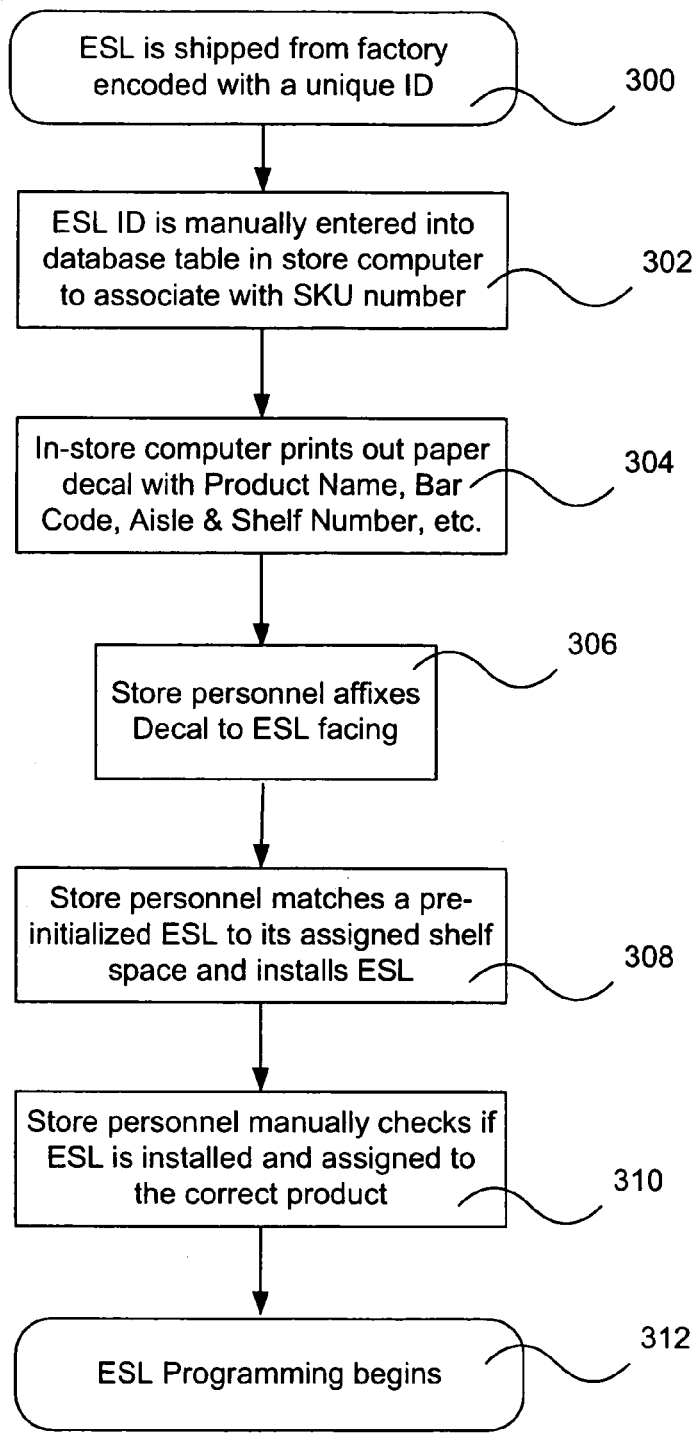
FIG. 3 is prior art flow chart for steps required in initialization of digital display in accordance with the present invention.
Figure 4:
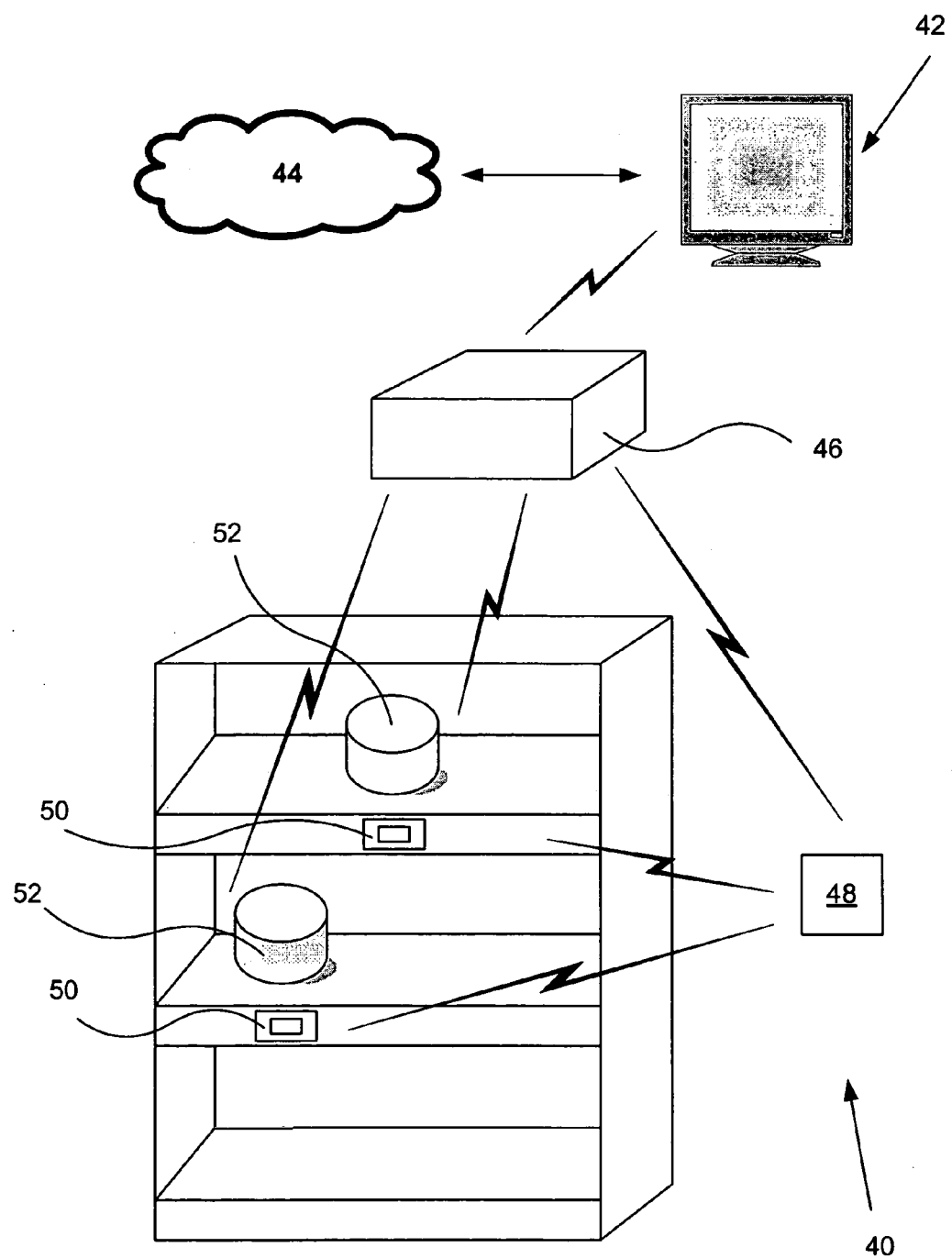
FIG. 4 is system for initializing a wireless display terminal in accordance with the teachings of the present invention.

Referring now to FIGS. 4, a system 40 includes a central store computer 42 possibly coupled to a central server via a Wide Area Network such as the Internet 44 and a wireless transceiver access point device 46. In one embodiment, the access point device 46 and the computer 42 are shown in wireless communication. In alternative embodiments, the access point device 46 can be hard physically coupled or wired to the computer 42 to allow communication via a physical medium, such as a cable. The access point device 46 is also wirelessly coupled to a handheld remote unit 48. The handheld remote unit 48 is used to initialize each of the WDTs 50, which are positioned at end of a shelf adjacent a product 52, as discussed in detail below. As indicated, the WDT 50 receives information from and can communicate information to the handheld remote unit 48. Furthermore, the WDT 50 can also communicate information to and receive information from the access point device 46.

Figure 5:
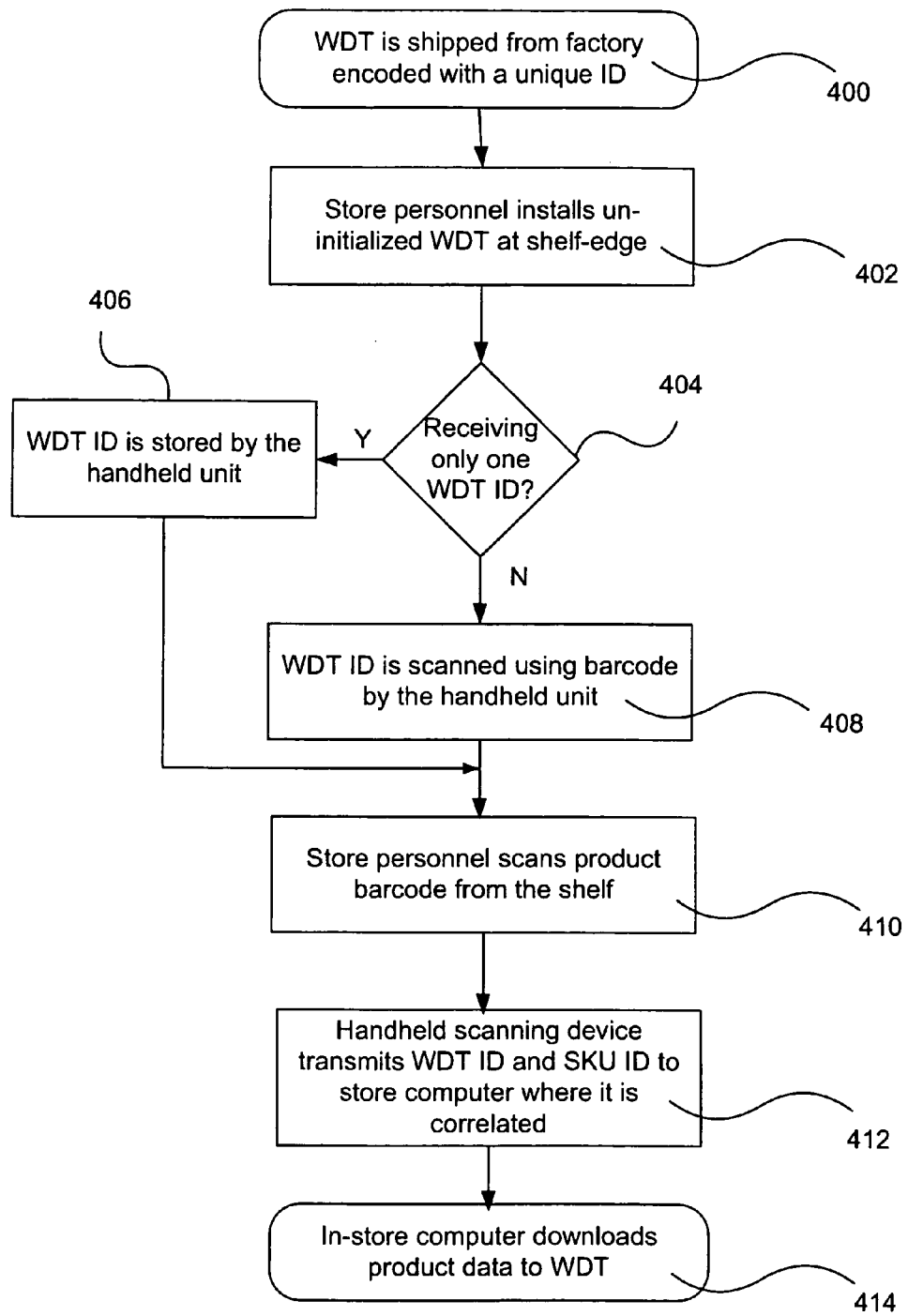
FIG. 5 is a flow chart for initializing the wireless display terminal of FIG. 4 in accordance with the teachings of the present invention.

Referring now to FIG. 5, the process of initializing a digital wireless terminal begins at step 400 upon receiving an un-initialized WDT from the factory. At step 402, an un-initialized WDT is installed at the shelf edge near the product it is required to label. At step 404, a hand-held two-way radio-communication enabled remote unit type of device equipped with a barcode reader and a RF transmitter/receiver is then used to "scan" the WDT.

The near field RF energy wakes up the digital wireless terminal causing it to either transmit its WDT identification to the handheld remote unit based reader, or display its digital wireless terminal identification in barcode form on its display screen, depending on the activity of the other WDTs that are located within range of the handheld remote unit.

At step 404, if the handheld remote unit determines that there is only one WDT wirelessly transmitting its WDT identification, then at step 406 the WDT identification of that WDT can be received via an RF transmission and stored by the handheld remote unit.

Alternatively, if there is more that one WDT transmitting that WDT's identification, then at step 408 the WDT will not accept the RF transmission and instead scan the barcode representation of the WDT's identification using the handheld remote unit's barcode reader. This is done so that there is a direct and proper correlation between the WDT and the product.

Thus, in one embodiment, the handheld remote unit scans the WDT identification of the WDT by receiving its RF transmitted WDT identification signal. In an alternative embodiment the handheld remote unit scans the WDT identification of the WDT by scanning the barcode representation of the WDT identification as displayed at the WDT.

At step 410, the personnel or installer then uses the handheld remote unit to scan the barcode of the product to be labeled by the WDT.

In an alternative embodiment, the order of scanning the WDT identification and scanning the Product identification can be reversed; these steps can be interchanged.

At step 412, the WDT identification and the product's barcode identification are then transmitted via the two-way radio-communication link to a store's computer system. The two corresponding identifications, one for the WDT and one for the product, are associated in a data table for future updates. The initialization process ends at step 414 when the store computer, via a central RF or IR network, downloads pricing and product information to the WDT to complete the initialization process.

Having fully described various embodiment and various alternatives, those skilled in the art will recognize, given the teachings herein that numerous alternatives and variations exist that do not depart from the invention. It is therefore intended that the invention not be limited by the forgoing description.

We claim:

1. A method for initialization of a display tag comprising the steps of
    placing a display tag on a shelf adjacent a product to be associated with the display tag;
    waking up the display tag using an RF signal from a handheld device;
    obtaining an identification indicia of the display tag stored on the display tag using the handheld device while the display tag is on the shelf;
    scanning, using the handheld device after the identification indicia of the display tag is obtained, the barcode of the a product to be associated with the display tag that is adjacent the display tag on the shelf;
    associating, in a database, the identification indicia of the display tag with the barcode of the product to be associated with that display tag; and
    wirelessly initializing the display tag having the identification indicia with product information for the product with the barcode using the identification indicia and product barcode in the database.

2. The method of claim 1 wherein the display tag generates the identification indicia as a transmitted signal.

3. The method of claim 1 wherein the display tag generates the identification indicia as a visual display.

4. The method of claim 1 further comprising enclosing a plurality of displays.

5. The method of claim 1 further comprising displaying data on the display using control logic.

6. The method of claim 5 further comprising communicating with the control logic of each display by wireless techniques.

7. The method of claim 5 further comprising communicating with the control logic of each display by optical techniques.

8. The method of claim 5 further comprising communicating with the control logic of each display by a wired connection.

* * * * *